Oct. 4, 1938.  W. L. MORRISON  2,131,746
BUMPER
Filed Jan. 27, 1936　　6 Sheets-Sheet 1

Inventor;
Willard L. Morrison,
By Parker & Carter, Attys.

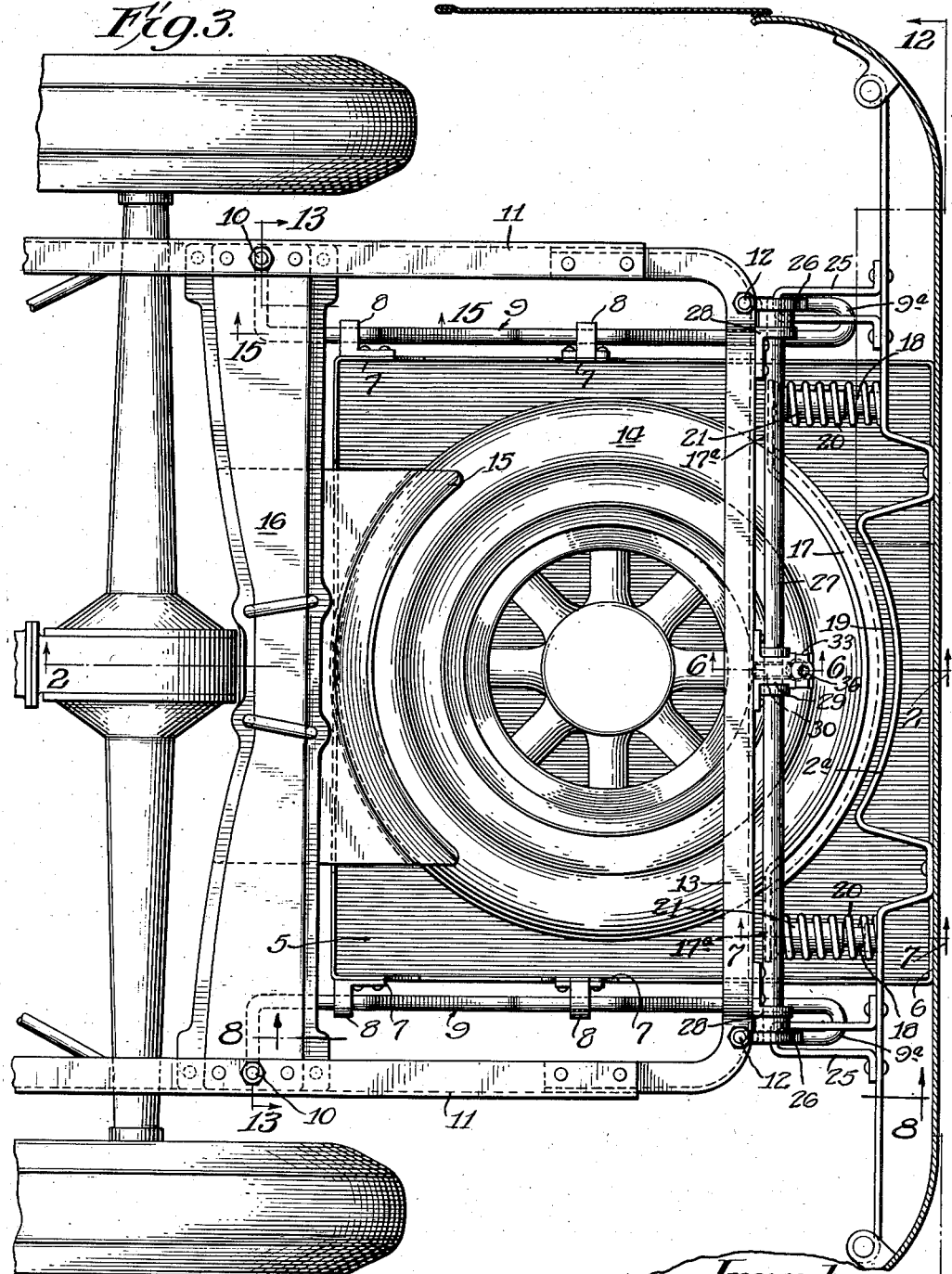

Oct. 4, 1938.　　　W. L. MORRISON　　　2,131,746
BUMPER
Filed Jan. 27, 1936　　　6 Sheets-Sheet 3
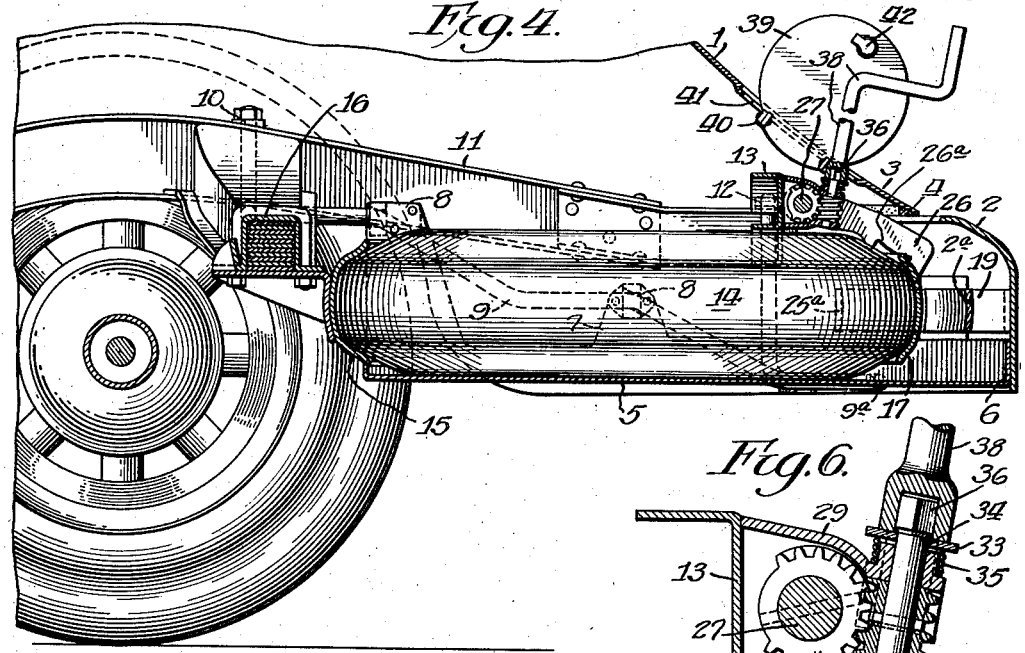
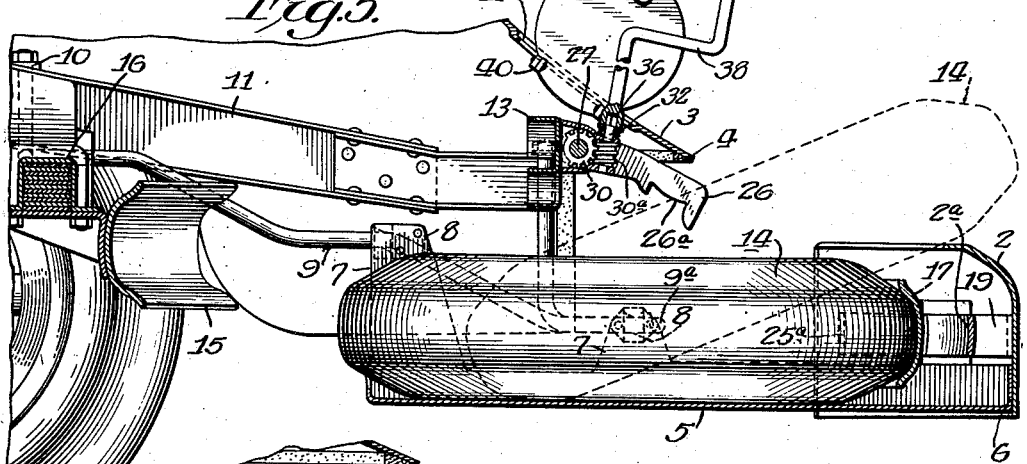
Inventor:
Willard L. Morrison,
By Parker + Carter Attys.

Oct. 4, 1938. W. L. MORRISON 2,131,746
BUMPER
Filed Jan. 27, 1936 6 Sheets-Sheet 4
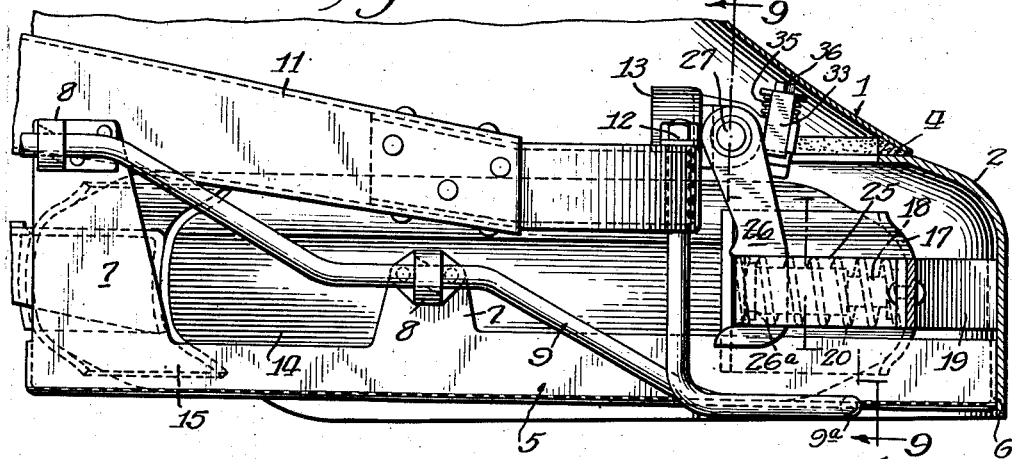
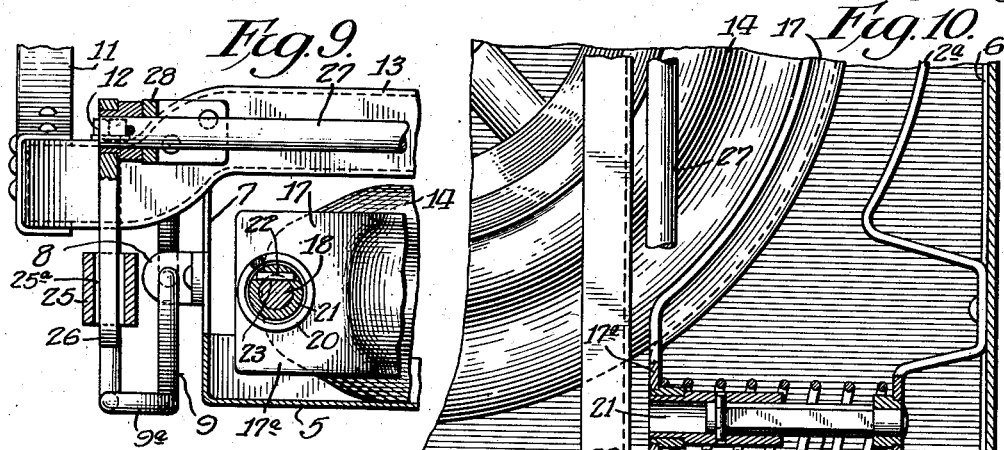
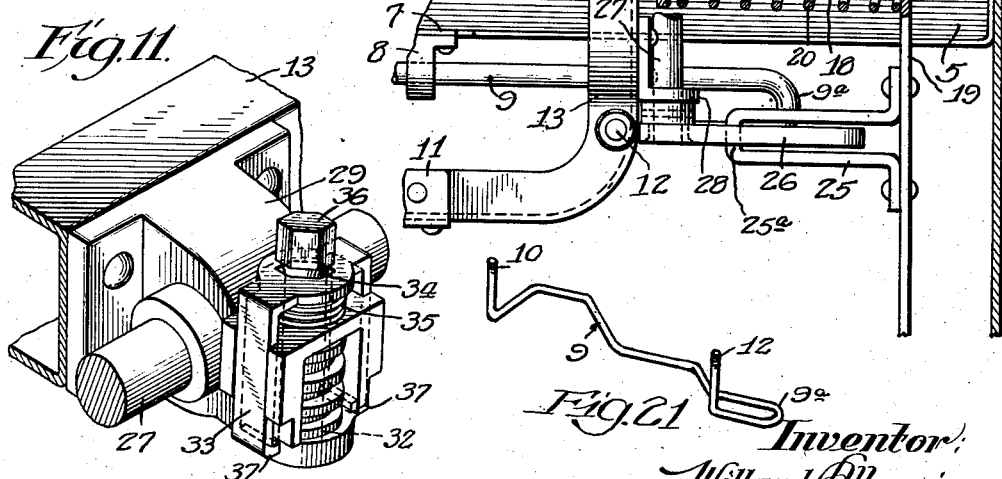

Oct. 4, 1938. W. L. MORRISON 2,131,746
BUMPER
Filed Jan. 27, 1936 6 Sheets-Sheet 5
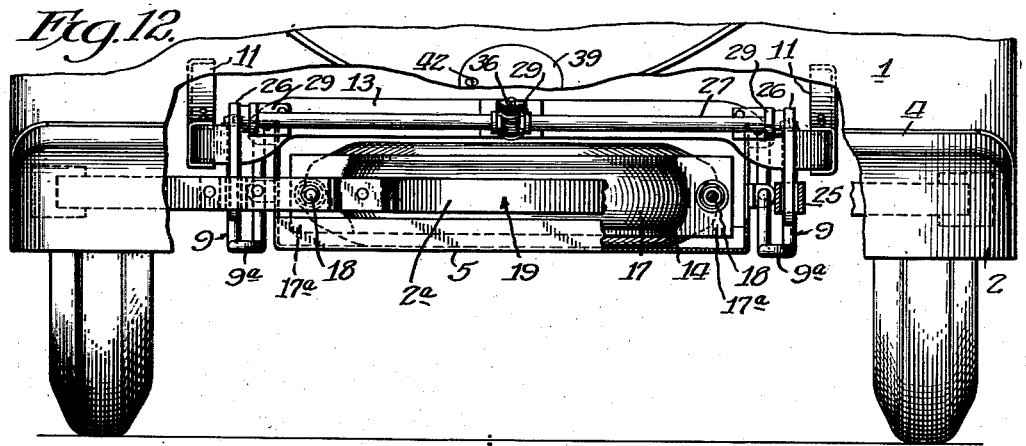
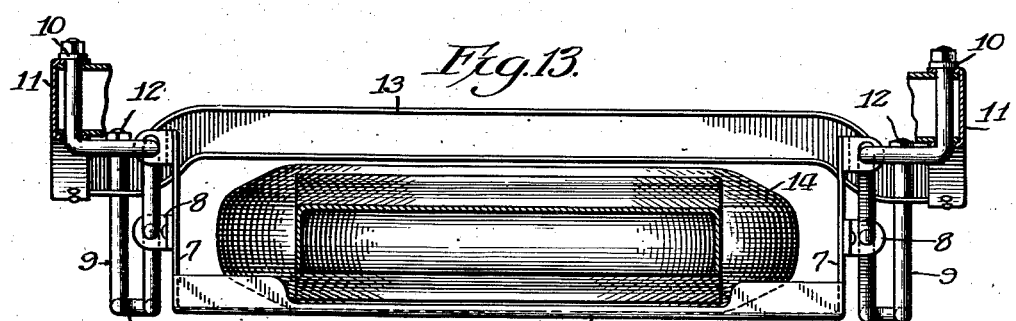
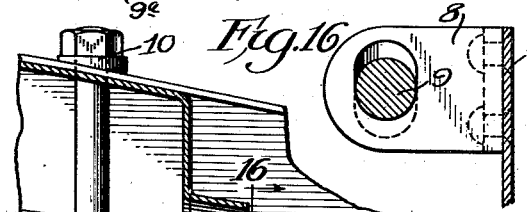
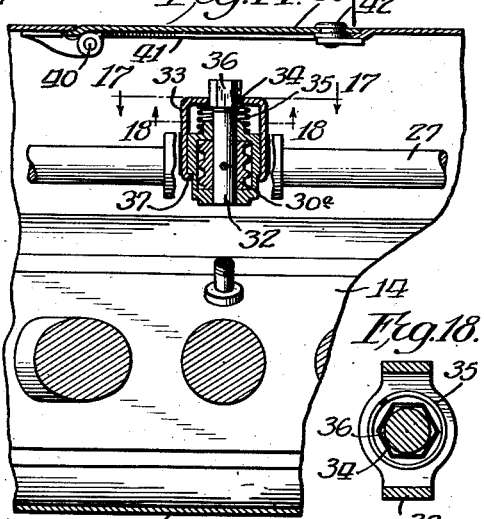
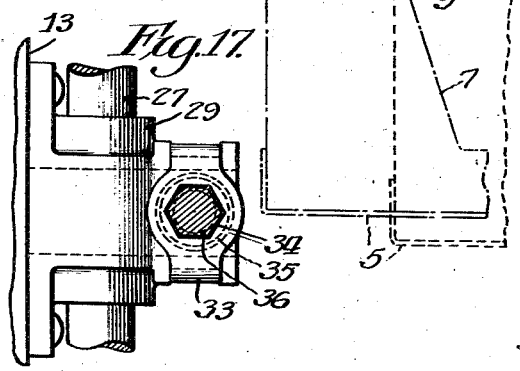
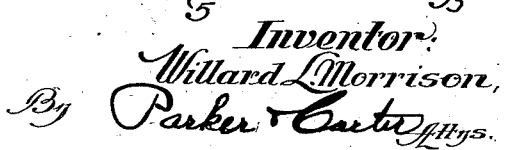
Inventor:
Willard L. Morrison,
By Parker & Carter Attys.

Oct. 4, 1938.   W. L. MORRISON   2,131,746
BUMPER
Filed Jan. 27, 1936   6 Sheets-Sheet 6

Inventor:
Willard L. Morrison,
By Parker & Carter
Attys.

Patented Oct. 4, 1938

2,131,746

UNITED STATES PATENT OFFICE 2,131,746

BUMPER

Willard L. Morrison, Lake Forest, Ill.

Application January 27, 1936, Serial No. 60,992

17 Claims. (Cl. 293—55)

This invention relates to bumpers and has for its object to provide a new and improved device of this description.

The invention has as a further object to provide a bumper which utilizes the tire as a resisting element and which is arranged to easily remove the tire from its bumper acting position and placing it in such bumper acting position. The invention has as a further object to provide means for compressing the tire when in its normal bumper acting position. The invention has as a further object to provide easy access to the control means for the tire. The invention has as a further object to provide a combined tire carrier and bumper.

The invention has other objects which are more particularly pointed out in the accompanying description.

Referring now to the drawings,

Fig. 3 is a sectional view taken on the line 3—3 of Fig. 2;

Fig. 4 is a view similar to Fig. 2, but showing the bumper released from the tire;

Fig. 5 is a view similar to Fig. 4, showing the bumper after it has been pulled backward and in position to remove the spare tire;

Fig. 6 is an enlarged sectional view taken on line 6—6 of Fig. 3, showing the gearing and operating crank in position to be rotated, the worm gear locking washer being depressed and disengaged from the hexagon nut, connected to the shaft which is pinned to the worm gear;

Fig. 7 is an enlarged sectional view with parts broken away, taken on line 7—7 of Fig. 3;

Fig. 8 is an enlarged sectional view taken on line 8—8 of Fig. 3 with parts broken away;

Fig. 9 is an enlarged sectional view with parts broken away, taken on line 9—9 of Fig. 8;

Fig. 10 is an enlarged fragmentary view of the lower right hand portion of Fig. 3, but with the bumper in a position as shown in Fig. 4;

Fig. 11 is a perspective view with parts broken away, of Fig. 6 with the operating handle removed;

Fig. 12 is a view with parts broken away, taken on line 12—12 of Fig. 3;

Fig. 13 is a sectional view on the line 13—13 of Fig. 3;

Fig. 14 is an enlarged fragmentary sectional view with parts broken away, taken on line 14—14 of Fig. 2;

Fig. 15 is an enlarged sectional view with parts broken away, showing the tire carrying pan in dot and dash lines and partially moved rearwardly in dotted lines, taken on line 15—15 of Fig. 3;

Fig. 16 is an enlarged sectional view with parts broken away, taken on line 16—16 of Fig. 15;

Fig. 17 is a sectional view with parts broken away, taken on line 17—17 of Fig. 14;

Fig. 18 is an enlarged sectional view taken on line 18—18 of Fig. 14;

Fig. 21 is a perspective view of the lower guide rod, as shown in Fig. 3.

Like numerals refer to like parts throughout the several figures.

Figure 1:
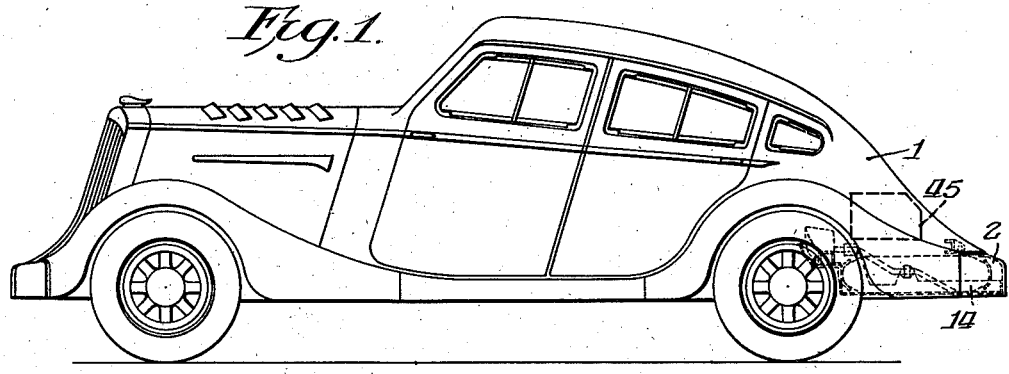
Fig. 1 is a side view of an automobile with the tire carrier and bumper shown at the rear of the car.

At the rear of the car the body 1 continues to the bumper element 2 and has the portion 3 overlapping the bumper element at 4. There is a rectangular flat pan 5 fixed at 6 to the bumper element 2. There are a plurality of angle brackets 7 near the rear and at both sides of the pan 5, the parts 8 of which form bearings which slide on and are supported by the supports 9, fastened at 10 to the frame 11 of the automobile. The other ends of these supports are fastened at 12 to a cross member 13, which ties the members of the frame 11 together at its ends.

Figure 2:
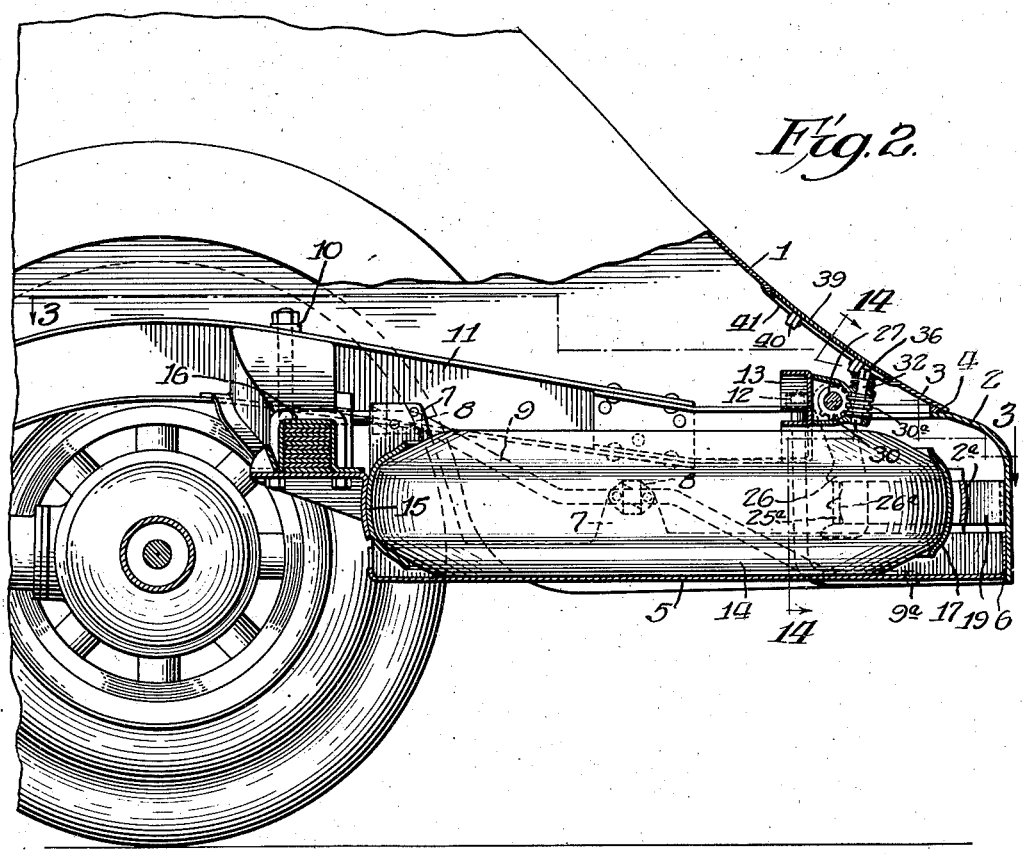
Fig. 2 is an enlarged view of the rear end of the car, with parts broken away to show the spare tire and associated parts in place to act as a shock absorber and bumper, taken on line 2—2 of Fig. 3.
Figure 19:
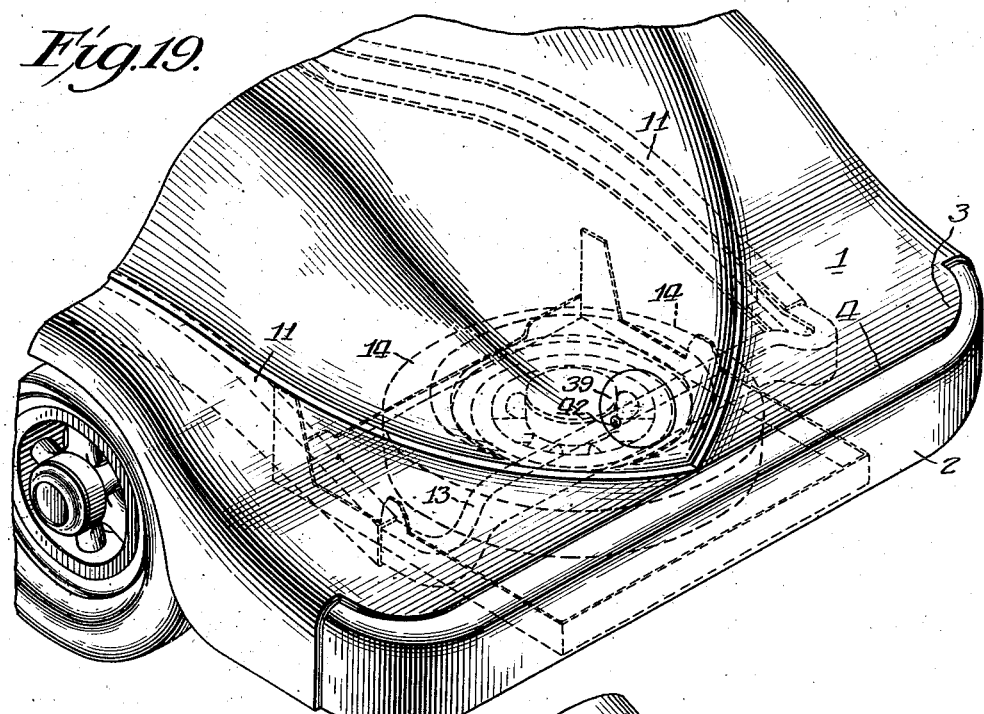
Fig. 19 is a perspective view of the parts shown in Fig. 2.
Figure 20:
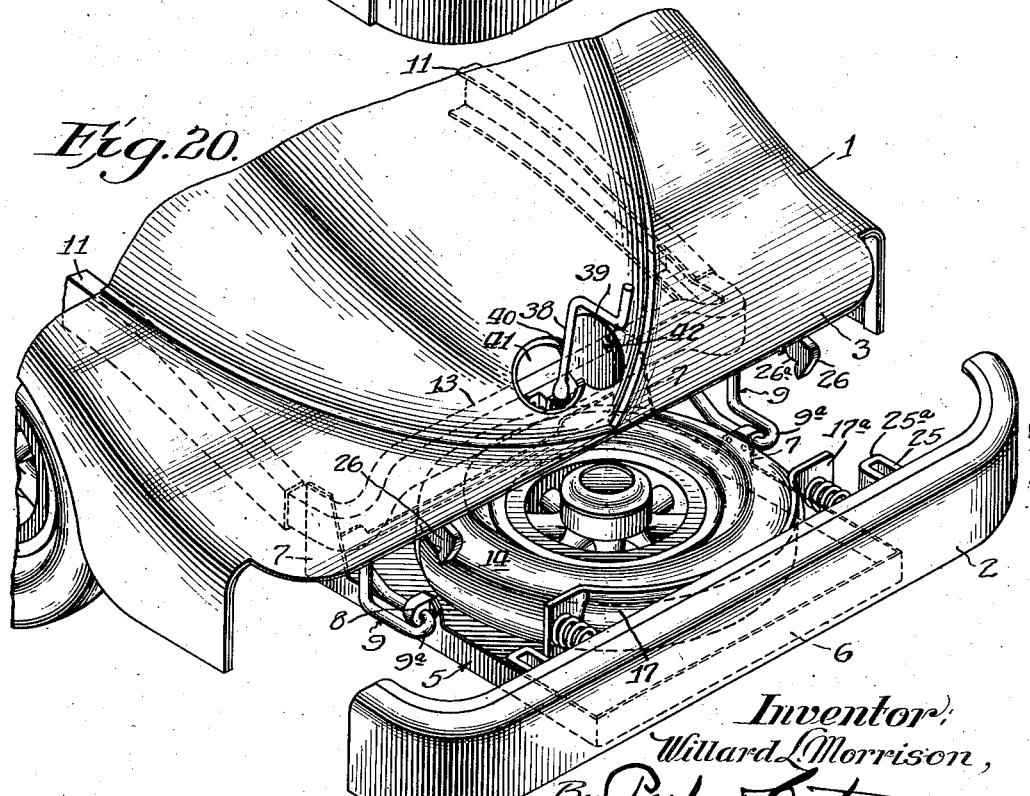
Fig. 20 is a view similar to Fig. 19, but with the bumper pulled out and having the spare tire released and ready to be removed from its supporting pan as shown in Fig. 5.

The spare tire and wheel 14 is positioned and securely clamped between resisting member 15, fastened to cross member 16, and clamping member 17 slidably attached to pins 18 which are fixed to bumper member 19, see Figs. 2 and 8. Compression springs 20 are placed between the bumper member 19 and the clamping member 17 and are positioned by hollow sleeves 21. Pins 22 in the sleeves 21 prevent the clamping member 17 disconnecting from pins 18, which engage a flat portion 23 and have their movement limited by the head 24 see Fig. 7. The eye members 25 are fastened to the bumper member 19 and coact with arms 26 fixed to shaft 27, which is journaled in bearings 28 fastened to cross member 13, see Figs. 3, 8, 9 and 10. At the central portion of the cross member 13 is bearing 29, see Figs. 3 and 11, which also forms a housing and bearing for worm wheel 30, fastened to operating shaft 27 and engaging worm 30a.

To prevent undesirable rotation of shaft 32, a U-shaped bracket 33, having a hexagonal opening 34 at its upper horizontal portion, is slidably mounted about it, see Fig. 11, and a compression spring 35 urges the bracket 33 into registry with operating nut 36. Stops 37 limit the upward movement of the bracket 33. When the operating wrench 38 is placed on the nut 36 it pushes the bracket 33 down and out of engagement with the nut 36, see Figs. 6 and 11. When the operating wrench 38 is removed it allows the bracket 33 to surround the nut 36 and prevent rotation, see Fig. 14.

A cover plate 39 in the body 1 is hinged at 40 and forms an opening 41 for the wrench 38. A lock 42 prevents unauthorized removal of the spare tire by preventing rotation of the nut 36.

As shown in Figs. 2, 3, 8 and 19, the parts are in a normal position, i. e., cover plate 39 is locked, the arm 26 has been revolved to pull eye 25, which pulls bumper element 2, compressing spring 20, urging clamping member 17 against spare tire 14, which in turn transfers its movement to resisting member 15. This arrangement prevents any rattle and keeps the tire, bumper and other parts in resilient tension.

The arm 26 has a notch 26a which registers with the end 25a of the eye 25, preventing undesirable movement of the bumper element 2, that is, it helps support the weight of the bumper. The bumper element 2 is also held in position by the pan 5, angle brackets 7 and bearings 8 which are connected to the supports 9 connected to frame 11. Body 1 prevents injury to and conceals the spare tire at the top and sides, bumper element 2 at the rear, and pan 5 at the bottom.

Any impact to the bumper element 2 will be transmitted first through springs 20, thence to clamping member 17, tire 14 and finally to cross member 16 and the frame of the automobile. If the impact is heavy enough to cause the circular portion 2a of the bumper element 2 to impinge upon clamping member 17, then force transmitted through the bumper element 2 will be distributed through the end 17a of the clamping member 17, and the portion impinging on the circular portion 2a of the bumper element. In other words, the bumper will have contact with the member 17 at three points, see Fig. 3.

When it is necessary or desirable to remove the spare tire, cover plate 39 is unlocked and swung open. Wrench 38 is used to rotate shaft 27, swing arms 26 away from eye 25, causing spring 20 to push the bumper element 2 rearwardly to the limit of the flat portion 23 on the pin 18. This action releases the pressure of the clamping member 17 from the tire 14, see Figs. 4 and 10. The bumper element 2 can then be pulled back manually until the centrally disposed bearings 8 of the pan strike the loop 9a of the support 9 on which they slide. The tire 14 shown in dotted lines is being removed, see Fig. 5.

In replacing a tire in the carrier, the reverse procedure is used. That is, the tire is placed on the pan 5, see Fig. 5, the bumper and pan being pushed in, see Fig. 4, the arm 26 rotated and forcing the bumper and pan against spring 30 securely clamping the tire in place between members 15 and 17, see Figs. 2 and 3.

It sometimes happens in backing an automobile up to a railroad platform or the like that the bumper passes above the platform and some part of the platform or other device strikes the gasoline tank and injures it, often rupturing it so that gasoline leaks out. With the present construction that is avoided as the gasoline tank 45 is above the bumper and the tire and tire supporting mechanism, so they cannot be injured by backing of the automobile against or over any obstruction.

It will further be noted that one of the tire engaging members is attached to the bumper element and the bumper element is movable with relation to the body of the automobile and is moved rearwardly to bring the parts in position so that the tire can be removed or replaced, the tire moving with the bumper element as it is moved rearwardly or forwardly. I have shown a construction where the bumper is located at the rear of the automobile, but the same construction may be used at the front end of the automobile, and such a construction can be used where it is desired to have two spare tires.

I have described in detail a particular construction, but it is of course evident that the parts may be varied in many particulars without departing from the spirit of the invention as set out in the claims hereto appended, and I therefore do not limit myself to the particular construction shown.

I claim:

1. An automobile bumper device comprising a bumper element, a stop device at a distance from the bumper element, a wheel with a pneumatic tire supported between the stop device and the bumper element, and acting to oppose the movement of the bumper element when the bumper element is struck, and means for moving the bumper element and the wheel in a substantially horizontal direction, to provide a space between the bumper element and the body to remove the tire.

2. An automobile bumper device comprising a bumper element, a stop device at a distance from the bumper element, a pneumatic tire between the stop device and the bumper element and acting to oppose the movement of the bumper element when the bumper element is struck, a supporting element underneath the tire and connected with said bumper element, the bumper element and the supporting device being movable in a substantially horizontal direction with relation to the body of the automobile to move the parts to a position where the tire can be removed.

3. An automobile bumper device comprising a bumper element, a stop device at a distance from the bumper fixed in position, a pneumatic tire supported between the stop device and the bumper element and acting to oppose the movement of the bumper element when the bumper element is struck, a supporting element underneath the tire and connected with said bumper element, the bumper element and the supporting device being movable in a substantially horizontal direction with relation to the stop device to move the parts to a position where the tire can be removed.

4. An automobile bumper device comprising a bumper element, a stop device at a distance from the bumper element, a pneumatic tire between the stop device and the bumper element and acting to oppose the movement of the bumper element when the bumper element is struck, a supporting device upon which the tire rests, said supporting device and the bumper connected together when the tire is in its removable position.

5. An automobile bumper device comprising a bumper element acting in conjunction with a pneumatic tire, and a movable common means separate from the bumper element for supporting the pneumatic tire and the bumper element.

6. An automobile bumper device comprising a bumper element acting in conjunction with a pneumatic tire, and a common means for slidably supporting the pneumatic tire and the bumper element, the tire being completely enclosed when in its operative position with relation to said bumper element.

7. An automobile bumper device comprising a bumper element, a stop device at a distance from the bumper element, a pneumatic tire supported between the stop device and the bumper element and acting to oppose the movement of the bumper element when the bumper element is struck, means for moving the bumper element and the tire rearwardly in a substantially horizontal direction, so that the tire can be removed.

8. An automobile bumper device comprising a bumper element, a stop device at a distance from the bumper element, a pneumatic tire supported between the stop device and the bumper element and acting to oppose the movement of the bumper element when the bumper element is struck, a holding device for releasably holding the bumper element in its operative bumper position with relation to said tire.

9. An automobile bumper device comprising a bumper element, a stop device at a distance from the bumper element, a pneumatic tire supported between the stop device and the bumper element and acting to oppose the movement of the bumper element when the bumper element is struck, a holding device for holding the bumper element in its operative bumper position with relation to said tire, a releasing device for said holding device.

10. An automobile bumper device comprising a bumper element, a stop device at a distance from the bumper element, a pneumatic tire supported between the stop device and the bumper element and acting to oppose the movement of the bumper element when the bumper element is struck, a holding device for holding the bumper element in its operative bumper position with relation to said tire, a releasing device for said holding device, said holding and releasing devices being concealed.

11. An automobile bumper device comprising a bumper element, a stop device at a distance from the bumper element, a pneumatic tire supported between the stop device and the bumper element and acting to oppose the movement of the bumper element when the bumper element is struck, a holding device for holding the bumper element in its operative bumper position with relation to said tire, a releasing device for said holding device, a door through which access is had to the releasing device, adapted to be locked to prevent tire theft.

12. An automobile bumper device comprising a bumper element, a stop device at a distance from the bumper element, a pneumatic tire supported between the stop device and the bumper element and acting to oppose the movement of the bumper element when the bumper element is struck, a holding device for holding the bumper element in its operative position with relation to said tire, a releasing device for said holding device, and an elastic device for moving the bumper element outwardly when released by the releasing device.

13. An automobile bumper device comprising a bumper element, a stop device at a distance from the bumper element, a pneumatic tire supported between the stop device and the bumper element and acting to oppose the movement of the bumper element when the bumper element is struck, a holding device for holding the bumper element in its operative position with relation to said tire, a releasing device for said holding device, and an elastic device for moving the bumper element outwardly when released by the releasing device, the bumper element and tire being slidable outwardly after the bumper element is released to a position where the tire can be removed.

14. An automobile bumper device comprising a bumper element, a stop device at a distance from the bumper element, a pneumatic tire supported between the stop device and the bumper element, the bumper element, stop device and tire being located below the gasoline tank and forming a removable rigid protecting structure for the gasoline tank.

15. An automobile bumper device comprising a bumper element, a stop device at a distance from the bumper element, a pneumatic tire supported between the stop device and the bumper element, and acting to oppose the movement of the bumper element when the bumper element is struck, and means for applying and maintaining pressure to the tire when in its bumper resisting position, whereby rattling of the parts is prevented.

16. A device of the kind described, comprising a tire located below the gasoline tank and projecting rearwardly therefrom a stop device for the tire, means for compressing the tire against said stop device, and a bumper element back of the tire and forming a removable rigid protecting structure for the gasoline tank.

17. A device of the kind described, comprising a tire located below the gasoline tank and projecting rearwardly therefrom slidable holding means for the tire, and a bumper element back of the tire, and means for removing and inserting the tire in position, whereby a removable rigid protecting structure is provided for the tank which permits accessibility to the tank.

WILLARD L. MORRISON.